United States Patent [19]
Kirschner

[11] 4,082,432
[45] Apr. 4, 1978

[54] HEAD-UP VISUAL DISPLAY SYSTEM USING ON-AXIS OPTICS WITH IMAGE WINDOW AT THE FOCAL PLANE OF THE COLLIMATING MIRROR

[75] Inventor: Robert Kay Kirschner, Bellevue, Wash.

[73] Assignee: Sundstrand Data Control, Inc., Rockford, Ill.

[21] Appl. No.: 745,949

[22] Filed: Nov. 29, 1976

Related U.S. Application Data

[63] Continuation-in-part of Ser. No. 539,672, Jan. 9, 1975, abandoned.

[51] Int. Cl.² ............................................. G02B 27/14
[52] U.S. Cl. .................................... 350/174; 358/250
[58] Field of Search ................. 350/174, 173, 199, 10, 350/27, 55, 286, 287, 201, 202; 356/251, 252; 354/54, 55, 224, 225, 155; 358/250

[56] References Cited
U.S. PATENT DOCUMENTS
2,981,165  4/1961  Estes ...................................... 354/54

FOREIGN PATENT DOCUMENTS
1,131,293  10/1968  United Kingdom ................. 350/174

OTHER PUBLICATIONS
Freeman, "Heads-Up Displays, Part 2", Optics Tech., Feb. 1969, pp. 175-178.

*Primary Examiner*—Jon W. Henry
*Attorney, Agent, or Firm*—Ted E. Killingsworth; Michael B. McMurry; William R. Peoples

[57] ABSTRACT

An on-axis, optical head-up display device, for use in fixed installations, vehicles or aircraft, utilizes a single block of transparent acrylic resin with the upper surface curved and coated to form a collimating mirror. The block itself is comprised of two major portions cemented together with a transparent bonding material wherein the resulting interface forms a combining surface. A generated image is transmitted from the focal plane of the collimating mirror upwardly through the combining surface; then it is reflected downwardly by the collimating mirror back to the combining surface which in turn serves to combine the generated image with a background view. The combined image is viewed by an observer through a back window of the block. Optical aberrations are reduced by extending the material of the block to the focal plane of the collimating mirror where an image generator is located.

26 Claims, 7 Drawing Figures

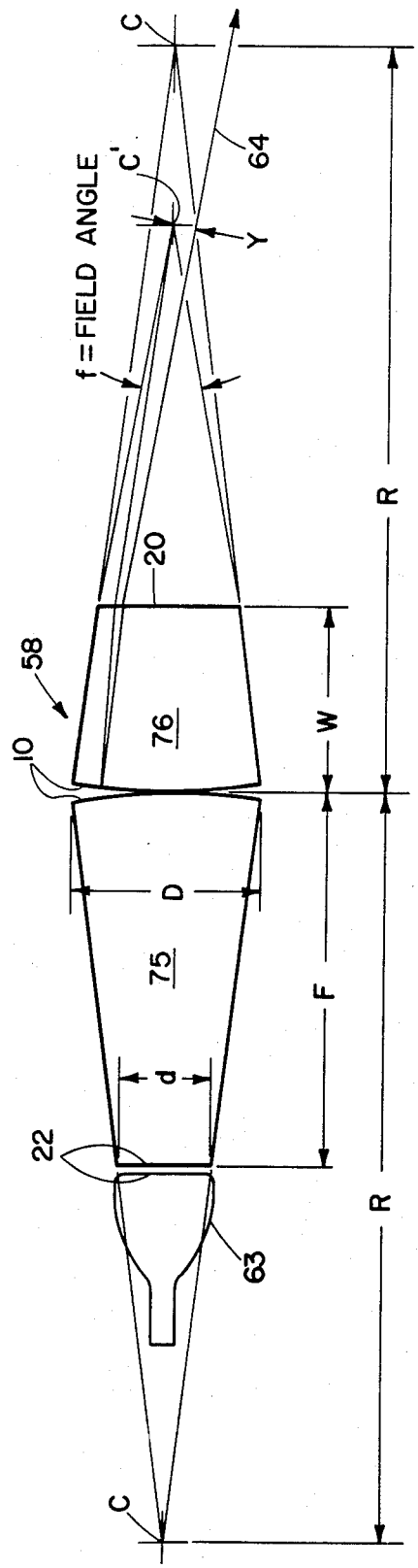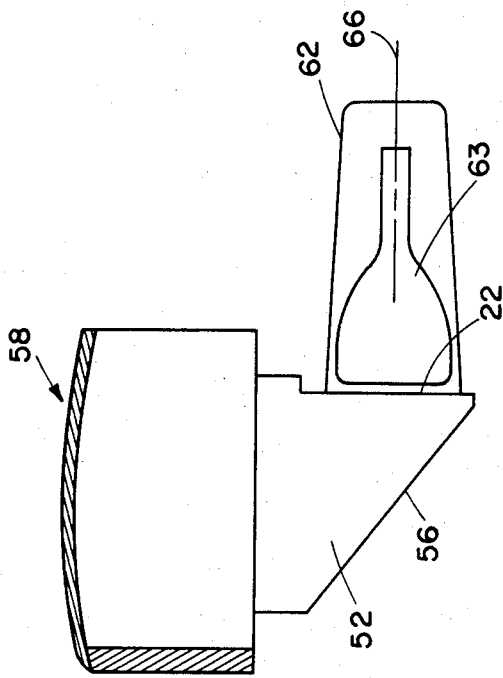

HEAD-UP VISUAL DISPLAY SYSTEM USING ON-AXIS OPTICS WITH IMAGE WINDOW AT THE FOCAL PLANE OF THE COLLIMATING MIRROR

CROSS-REFERENCE TO RELATED APPLICATION

This application is a continuation-in-part of Ser. No. 539,672, filed on Jan. 9, 1975 now abandoned.

BACKGROUND OF THE INVENTION

This invention relates to head-up optical display devices and more particularly to on-axis display devices using a single block of transparent material.

Typically, the prior art head-up display devices as represented for example by Kirschner U.S. Pat. No. 3,816,005, assigned to the assignee of this application, utilized an "off-axis" type device to provide a compact display for use in vehicles and aircraft. However, the off-axis techniques tend to impose limitations on the viewing zone, that is, the eye position relative to the optical combiner, resulting from the fact that the observer's line of sight is offset somewhat from the optical axis of the collimating mirror. In the off-axis devices this zone is rather restricted due to the narrow area where the light rays are adequately collimated. The optical distortions or minor inaccuracies of the off-axis type combiners are considered acceptable for such applications as aircraft landing aids but for applications with more precise requirements, such as sighting systems for weapons, significantly greater accuracy is required along with a larger field of view. In addition, the off-axis systems often required an image-projector location that interferred to some degree with the observer's lower field of vision.

Many of these disadvantages can be eliminated by using an "on-axis" type display system where the observer's eye is aligned with the optical axis of the mirror. An example of such a system is provided in Creighton U.S. Pat. No. 2,490,747. The prior art on-axis systems can be broken down into two general types: a reflective system using a spherical collimating mirror and a refractive system using collimating lenses and a combining plate. Schaefer U.S. Pat. No. 3,547,522 provides an example of a prior art reflective system and Searle et al U.S. Pat. No. 3,679,297 provides an example of a refractive system. In practice the reflective systems, as shown in Schaefer, have not been practical in aircraft because the relative orientation of the various elements such as the image generator and mirror are subject to significant distortion due to the vibration and strain inherent in most aircraft or vehicle environments. However, rigidizing the structure to overcome the effects of vibration in an aircraft, for example, inevitably requires structural elements that result in an undesirable obscuring of the pilot's view.

With respect to the refractive systems such as Searle et al, the optical properties of such systems that make use of separate optical elements, result in head-up display systems that have very significant disadvantages for combat aircraft. For example, it is considered desirable to have a field of view of at least 20° in head-up display used for combat aircraft weapons systems, but cockpit space constraints, such as instrument location and the requirement that the display apparatus be located outside of the pilot's ejection envelope, has resulted in refractive systems where it was necessary for the pilot to move his head up to 4 inches in each direction in order to see the full 20° field of view. This is a very serious disadvantage in combat aircraft that are subject to large "g" forces.

SUMMARY OF THE INVENTION

It is therefore an object of the invention to provide a head-up, on-axis display system wherein the primary optical elements are contained in a single image combining block in order to provide a head-up display with a wide field of view in a restricted area.

It is a further object of the invention to provide a head-up display system that requires a minimum of support structure that reduces obstruction of the observer's view.

It is still another object of the invention to provide an on-axis display system that permits the convenient location of an image generating device.

An additional object of the invention is to provide for minimal optical distortion of the generated image by extending the material of the block to the focal plane of the collimating mirror.

Yet another object of the invention is to provide an on-axis head-up display system with greatly reduced susceptability to heat damage and the production of extraneous images by virtue if its configuration which shields overhead light and heat sources, such as the sun or illuminating lamps, from entering the collimating optics and being imaged on the image generating means.

The major element in the invention is the image combining block which is fabricated out of a highly transparent material such as glass or a plastic such as a clear acrylic resin. The upper portion of the block is configured into a portion of a spherical mirror with the back surface of the mirror coated with a material so as to provide a high degree of reflectivity. The block itself is comprised of two major portions of transparent material that are joined together on a diagonal that runs from the upper edge of the front window of the block, i.e., the side from which light rays from a background view enters the block, downwardly to the rear portion of the block. The diagonal functions as an optical combining surface where the background view is combined with a generated image to produce a combined image. This is accomplished by applying a partially reflective, partially transmitive coating such as a dielectric type beam splitter coating to one of the diagonal surfaces prior to joining the diagonal surfaces with an optically transparent bonding material such that all voids are excluded from the interface.

The combining surface permits the transmission upwardly of a generated image to the collimating mirror. The mirror reflects this image back to the combining surface which, in turn, reflects the generated image through the rear window of the block to the eye of the observer. The combining surface also permits the transmission of the background view from the front window of the block to the back window thus, in effect, combining the background view with the generated image so as to provide a combined image for an observer.

The material of the block is extended downwardly to the focal plane of the collimating mirror. Since the block is transparent, this will not interfere significantly with the lower portion of the observer's view. Therefore by extending the material of the block down to the collimating mirror's focal plane and securing the image generating means to the block at this point, minimal optical distortion will be achieved.

Alternatively, the lower portion of the block may contain a prism that is effective to alter the relative position of the focal plane thus permitting the placement of the image generator in a position other than directly below the block itself.

BRIEF DESCRIPTION OF THE DRAWINGS

FIG. 6 is an illustration of the image combining block with the optics unfolded; and FIG. 7 is a perspective view of an image combining block with the image generator placed at right angles to the direction of viewing.

DETAILED DESCRIPTION OF THE INVENTION

Figure 1:
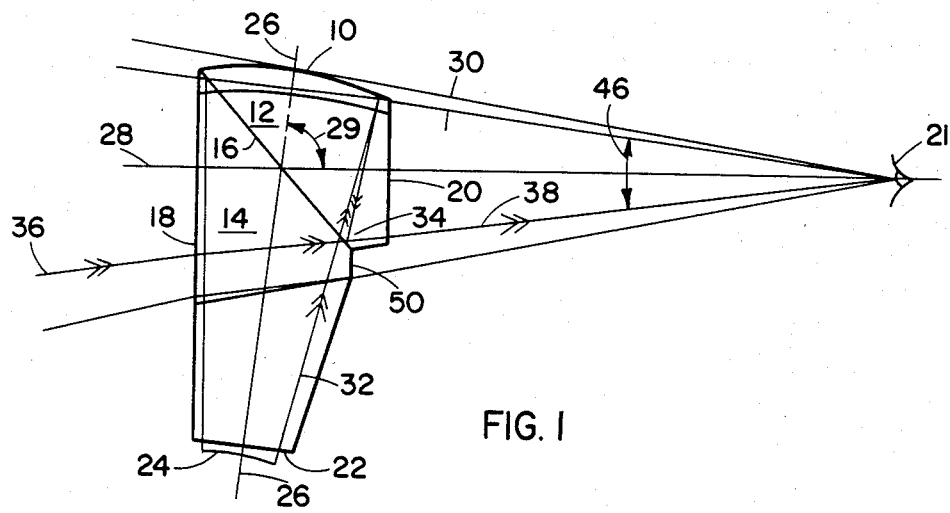
FIG. 1 is a left side view of an image combining block.

FIG. 1 of the drawings illustrates an embodiment of the image combining block. The upper surface 10 of the block is a curved surface which forms a portion of a sphere and is coated with a thin layer of evaporated aluminum thereby providing a mirror surface with a reflectivity of approximately 90 percent. It is this spherical surface that forms the collimating mirror. The block itself is formed of an upper portion 12 and a lower portion 14 which are joined together by a combining surface 16. The combining surface 16 consists of a beam-splitter coating of the partial metalization type or the more efficient dielectric type deposited on one of the joining surfaces. The upper and lower portions of the block are then joined with an essentially transparent bonding agent which serves to mechanically secure the two portions of the block together and to optically fill voids at the interface in order to prevent undesirable reflections. To minimize unwanted reflections it is further considered desirable that the bonding agent have an index of refraction similar to that of the block material or have a thickness of several wave lengths of light or both in order to avoid interference patterns. The beam-splitter coating is tailored to provide the desired degree of reflectivity when interfaced with the block material on one side and the bonding material on the other and when viewed at the appropriate angle of incidence. Such a beam-splitter is termed a cemented beam-splitter and is well known in the art. In the preferred embodiment of the invention a dielectric beam-splitter is deposited on the upper portion 12 of the block and the upper and lower portions are then bonded together with a clear epoxy resin. At this point, it should be noted that the optical function of the bonding material can be performed by a large variety of liquids, semi-solids, greases, etc.; or mechanical attachment of the block portions can be accomplished by other means such as external bracing to secure the two portions of the block together.

The combining block also includes a front window 18 oriented toward a background view, such as a runway where an aircraft using the head-up display is attempting to land, and a back window 20 through which a combined image of the background view and a generated image is viewed by the observer represented by the eye 21.

The lower part of the block contains the focal plane window 22 which faces the focal plane 24 of the collimating mirror 10. In the preferred embodiment of the invention the optical axis 26 of the collimating mirror 10 is inclined somewhat from a right angle relationship 29 with the forward viewing axis 28. The precise angle offset will be selected to minimize the obstruction to the forward view by the collimating mirror 10. An indication of the very minimal amount of obstruction to the forward view caused by the collimating mirror 10 is illustrated by the angle 30. Since the mirror 10 itself is the result of a very thin coating, it will be appreciated that the obstruction of the upper portion of the observer's view will be minimal.

In normal operation, an image generator (not shown), such as the projector taught in Kirchner U.S. Pat. No. 3,816,005, will be placed in an abutable relationship with the focal plane window 22 and generate an image that can represent a variety of desired inputs such as a weapon sight or a symbol indicating a landing point on a runway. In addition, various other image generators can be used, such as a computer driven CRT, to generate a display, or even a simple back-lighted reticle may prove of value as an image generator. In order to minimize the effects of spherical abberation on the generated image caused by the flat focal plane window 22, it is considered desirable to bring the body of the lower block 14 as close as possible to the image generator located at the focal plane 24. This results from the fact that the greater the spacing between the image generator and the focal plane window, the greater the aberration contributed by the flat focal plane window. It is therefore considered desirable that the focal plane window be in an abutable relationship with the image generator at the focal plane 24. However, instead of having an image generator abut the focal plane window 22, it would be possible to use a flat focal plane window spaced from the focal plane and accept the resulting abberation or use a concave focal plane window to reduce this abberation.

As illustrated by the arrows in FIG. 1, a typical light ray 32 generated by the image generator passes through the focal plane window 22 and through the combining surface 16 to be reflected downwardly by the collimating mirror 10 to the point 34 on the combining surface 16. At point 34 the image ray will be combined with a light ray 36, representing the background view, into a combined image ray 38. It is this combined image ray 38 that will appear to the observer, whose eyes are focused at infinity, to be the background view with the generated image as an integral part thereof.

Another very significant advantage of this structure has to do with the fact that the collimating mirror 10 would have a tendency to prevent extraneous light rays from overhead sources such as the sun or instrument lights from entering the system as is the case with refractive systems. Without this protection light from the sun which, of course, can be a very powerful source of heat as well, could enter the system and result in damage to the image generator along with the production of unwanted images at the focal plane. In fact, many of the prior art systems require special construction including heat compensating means to prevent light from the sun from damaging the image generators.

Figure 2:
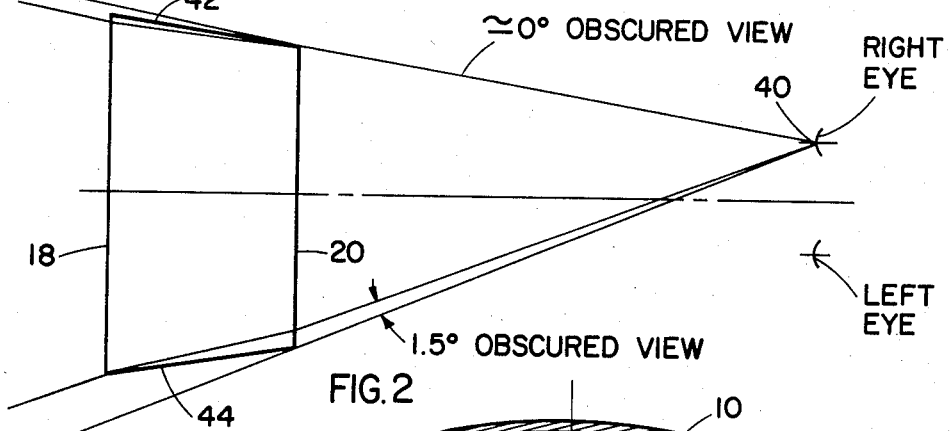
FIG. 2 is a top view of the image combining block.

FIG. 2 is provided to illustrate the very small amount of the observer's lateral view that is obscured by the combining block because the sides 42 and 44 of the block are configured substantially parallel to the observer's field of view. Taking the right eye 40 as an example, the right side 42 of the block will obscure right eye's view less than one degree and the left side of the block will obscure only about 1.5° of the right eye's view. The amount of the left eye's lateral vision obscured is equivalent to less than 1° while about 1.5° of vision is obscured by the right side 42 of the block. Therefore, it will be appreciated that the combined vision of both eyes will in effect have less than one degree of the lateral vision obscured.

These performance characteristics may be achieved in a system having the following optical characteristics: a front window 18 having a width of 8.2 inches (20.8 cm); a rear window 20 having a width of 6.8 inches (17.3 cm); the distance between the front and rear window 4.4 inches (11.2 cm); a vertical field of view, 46 of FIG. 1, of 16°; and an 18 inch (45.7 cm) radius of curvature for the collimating mirror 10. In this particular embodiment, an 18 inch (45.7 cm) radius of curvature was used in order to reduce the size of the focal plane 24. Nominally, the spherical collimating mirror is viewed at normal incidence to its surface. Considering refraction at the back window and a block material with index of refraction N=1.49, this would locate the observer approximately 9 inches (22.9 cm) from the back window. However, there is no serious deterioration in the collimation of the image when the observer is moved back to 12 inches (30.5 cm) which is more convenient for certain operating environments such as the cockpit of an aircraft. Therefore the above dimensions of the image combining block were predicated on the observer being 12 inches (30.5 cm) from the back window and additionally having a lateral distance of 2.5 inches (6.3 cm) between the eyes. These dimensions are representative of an optical display apparatus which would typically be used in an aircraft landing approach system where the relatively wide lateral view would accommodate crabbed approaches. A weapons' delivery sight, on the other hand, would be viewed from farther back in the cockpit and would require less of a lateral view. Here the back window 20 would be higher and not so wide.

Figure 3:
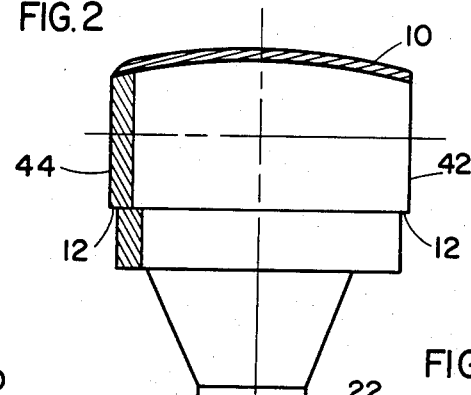
FIG. 3 is an observer's right eye view toward the display generated by the image combining block.

FIG. 3 illustrates the view from the observer's right eye 40 of the on-axis optical display system. As indicated before, the collimating mirror 10, because of its location, obscures very little of the upper portion of the observer's view. By the same token, the right side 42 of the block obscures almost none of the view from the observer's right eye 40; likewise, the left side 44 of the block obscures very little of the observer's view. In addition, the observer's outside view below the main portion 12 of the block need not be obscured in this embodiment because, as indicated in FIG. 1, window surface 50 may be provided parallel to the front window surface 18 for undistorted forward viewing. It has also been found desirable to paint the sides 42 and 44 of the block with a non-reflecting material so as to reduce reflections off of the block.

Figure 4:
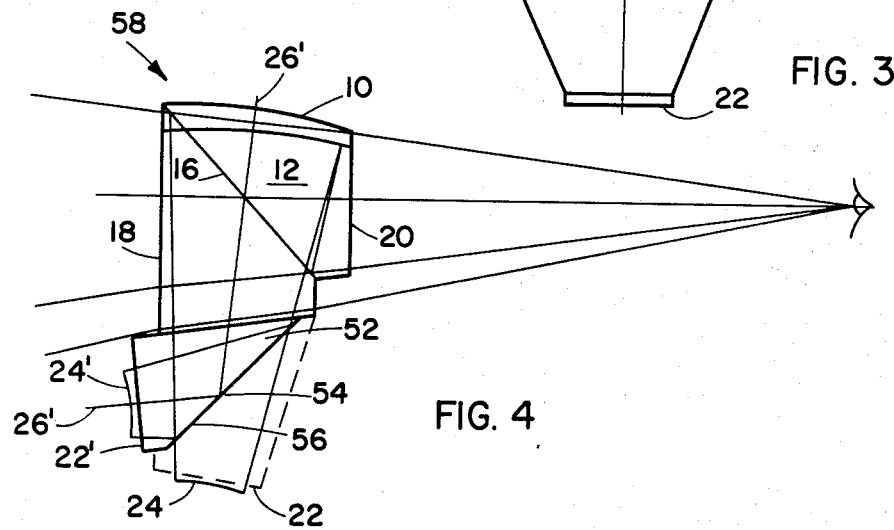
FIG. 4 is a left side view of an image combining block utilizing a prism for altering the location of the image generator.

It is also desirable to provide means for relocating both the focal plane window 22 and the focal plane 24 in a position other than that shown in FIG. 1. What is required then is a means of changing the direction of the generated image with a minimum of distortion. A modification of the preferred embodiment of the invention to implement this feature is shown in FIG. 4. In this embodiment the portion 14 of the block, instead of extending all the way down to the focal plane 24, as in FIG. 1, includes a prism 52. The prism 52 will have the effect of relocating the focal plane 24' of the mirror 10 and the focal plane window 22' forward of the block so that the image generator may be located in a more convenient position, such as behind the instrument panel of an aircraft. It is apparent that the image generator may be located in a wide variety of positions merely by selecting the appropriate prism or prisms. If the angle of incidence 54 of light rays to be reflected to the mirror 10 is adequate, internal reflection may be relied upon, otherwise, the reflecting surface 56 may be silvered or coated to provide for adequate reflection. It also may be desirable to combine the prism 52 with an extension of the body 14, as shown by the dashed lines in FIG. 4 by replacing the mirror surface 56 with a combining surface such as a cemented beam-splitter similar to the combining surface 16, in order to provide a dual source of generated images. For instance, this would make it possible to use two image generators alternatively or simultaneously such as a CRT for generating one type of target information and a back-lighted reticle for providing back-up target information.

Figure 5:
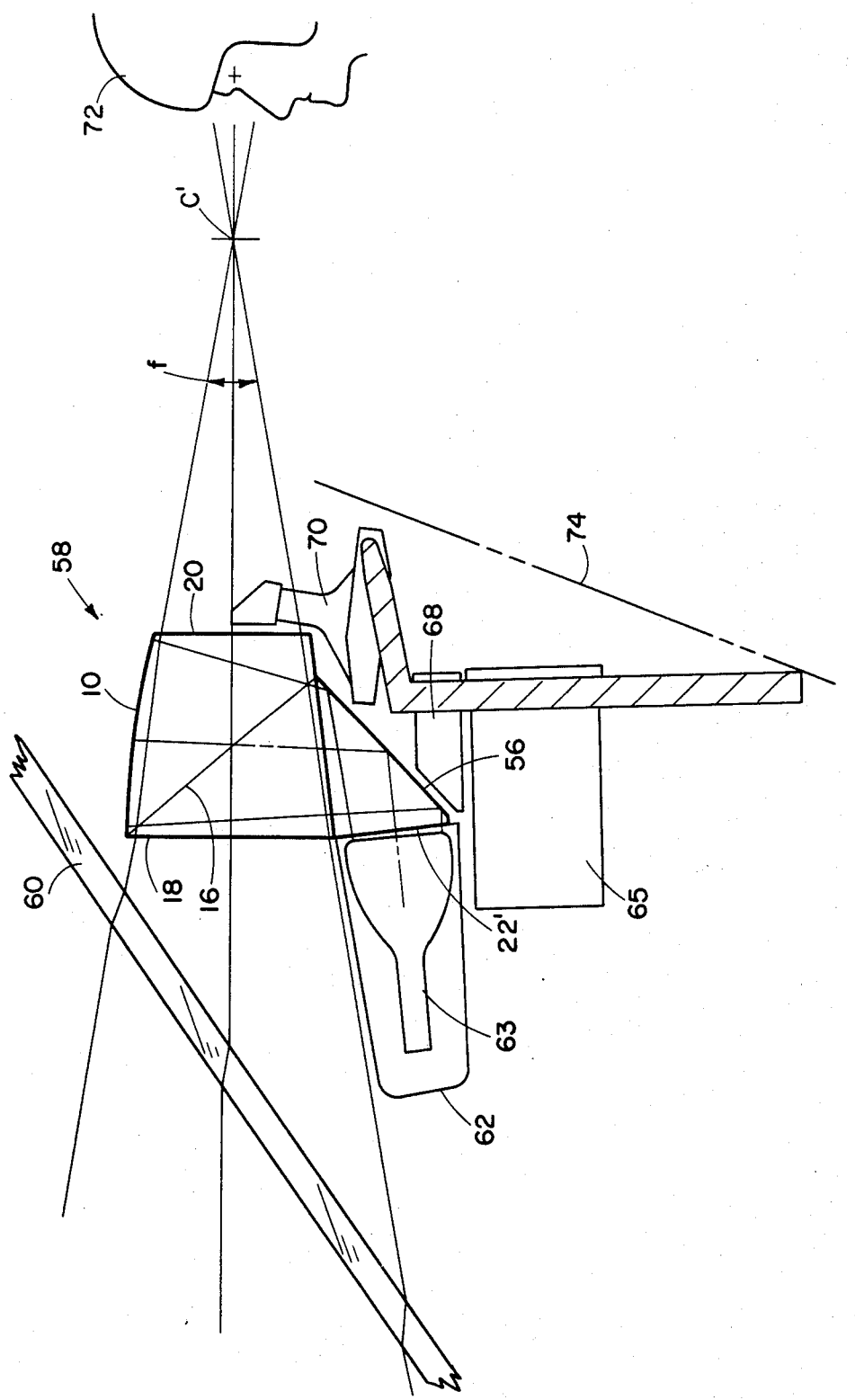
FIG. 5 is an illustration of an embodiment of the image combining block in an aircraft cockpit.

An illustration of an image combining block 58, similar to that shown in FIG. 4, as utilized in an aircraft cockpit environment, is provided in FIG. 5. The image combining block 58 in FIG. 5 includes a collimating mirror 10, a combining surface 16, a front window 18, a rear window 20, an image window 22, which is located at the focal plane of the collimating mirror 10, and a reflecting surface 56. Light rays from the background view enter the front window 18 of the image combining block 58 through the aircraft's windshield 60. An image generator 62, using a cathode ray tube 63, for example, is secured to the image window 22 of the image combining block 58. Included in the cockpit is an instrument panel 64 which supports the various flight instruments such as an attitude director indicator 65 and other display instruments as indicated at 68. A gun camera 70 usually forms a part of the cockpit environment as well. The image combining block 58 is usually supported by a separate support structure which is not shown. The location of the pilot within the cockpit is indicated by the reference numeral 72. A dash line 74 serves to indicate the limit of the ejection envelope which is an important design consideration in combat aircraft. It will be appreciated from the illustration in FIG. 5 that the image combining block 58 that includes a reflecting surface 56 for redirecting the focal plane of the collimating mirror 10 in a forward direction approximately at right angles to the axis of the collimating mirror 10, provides very substantial advantages in adapting head-up display apparatus for use in combat aircraft. For example, the image combining block 58 as shown in FIG. 5 interferes to a very minimal extent with the aircraft's instruments 65 and 68; provides room for conveniently locating the gun camera 70; requires a minimum of support structure in the pilot's view while at the same time providing a practical head-up display device with an adequate field of view.

In most modern combat aircraft, weapon delivery sights require a field of view or aperture $f$ of approximately 20° and additionally must be located forward of the ejection envelope 74. Prior art head-up display units used as weapon sights require a considerable volume of optical collimating lenses in refractive systems or optical elements such as mirrors and combining plates along with a support structure in reflective systems that by necessity must be located out of the pilot's 72 forward view. Also, the structural and optical requirements of the optical elements in prior art head-up display systems usually means removal of a portion of the instrument panel 64, thereby interfering significantly with the location of the aircraft instruments 66 and 68. Because of the above limitations, prior art head-up display units usually result in a viewing aperture providing a smaller field of view than the field of view produced by the image generator, thus resulting in excessive pilot head movement to complete the total required field of view. Requiring the pilot to move his head more than one or two inches is a significant disadvantage in combat aircraft in that due to high g forces, it is often very difficult or impossible for the pilot to move his head sufficiently to view the entire field in tight turns.

The optical properties of the image-combining block 58 of FIG. 5 are illustrated in FIG. 6 in an unfolded form. The image combining surface 16 of FIG. 5 has been left out of FIG. 6 for simplicity of illustration. The left hand section of the block 74 abuts the image generator 62 and has a length equal to the focal length F of the mirror 10. The focal length F of the mirror 10 is equal to one-half of the radius of curvature R of the collimating mirror 10. The diameter $d$ of the focal plane of the collimating mirror 10, located at the image window 22, is equal to one-half the mirror diameter D of the collimating mirror 10. The right hand portion 76 of the combining block of FIG. 6 represents the portion of the combining block that transmits the light rays from the collimating mirror 10 to the back window 20. In FIG. 6, the point C represents the center of curvature of the collimating mirror 10 and the point C' represents the apparent or optical center of curvature of the collimating mirror 10. The apparent center of curvature C' is closer to the back window 20 due to the refractive nature of the planar surface of the back window 20. The optical properties of the image combining blocks 58 of FIG. 5 and FIG. 6 can be described by a number of equations. For example, the diameter D of the collimating mirror 10 governs the size of the image generator 62 at window 22' since the diameter $d$ of the mirror's focal plane is equal to:

$$d = D/2$$

Due to the refractive nature of the material of the combining blocks 58, the diameter D of the collimating mirror 10 is related to the radius R of the collimating mirror 10, the field angle $f$, where $f$ is measured in radians, and the index of refraction N by the following equation for small angles about the optical axis of the mirror 10 for what is essentially the paraxial region of the optical system:

$$D = Rf/N$$

Thus the focal length F, which in a spherical system is equal to one-half of the mirror's radius of curvature R, is governed by the following relation:

$$F/D = N/2f$$

Therefore, the aspect ratio of the focal length F of the collimating mirror 10 over the diameter D of the mirror is approximately equal to N over 2f. It should be noted here that for a comparable system using discrete elements the N term would not be present in the above equations and relationships and as a result the aspect ratio of the solid optic system of FIGS. 5 and 6 would be greater than an open system by a factor of N.

One effect of using the solid optic of FIG. 5 is to provide a head-up display system having a greater aspect ratio that as a result can have a longer focal length by a factor of N for a given image diameter $d$ and field angle $f$ which allows the placement of the image generator 62 out of the field of view and further behind the instrument panel 74 thereby reducing interference with the instruments 65 and 68. For example, in an image combiner configured out of acrylic resin having an index of refraction N = 1.49, the focal length F can be as much as 1.49 times as long as a comparable system using discrete elements. As a result, for a given field angle $f$, the use of a solid optic or image combiner 58 allows the designer greater flexibility in selecting a smaller mirror diameter D and hence a generated image diameter $d$, along with a longer focal length F for a particular cockpit environment due to the refractive properties of the block 58. In other words, both the image diameter $d$ and the focal length F can be larger for a given field of view $f$ than would be the case for a similar system using separate optical elements. Another advantage of this increased focal length F is that it insures that there is sufficient distance between the collimating mirror 10 and the focal plane 22 to insert the reflecting surface 56 of FIG. 5 so that the image generator can be located behind the main portion of the image combining block 58. This is a very substantial advantage over the open reflective system as shown in Schaefer because for a field angle $f$ of 20° there would not be sufficient focal length in an open system to allow the reflecting surface 56 to be used thereby preventing the location of the image generator 62 behind the block as shown in FIG. 5. Thus the high aspect ratio of a closed system makes it possible to provide a reflective system having a field angle of 20° or greater while still permitting the image generator 62 to be located behind the image combining block instead of in front of it.

For head-up display systems with a predetermined value of spherical aberration A the solid optic or combining block 58 has a significant advantage over a system utilizing a separate optical elements. The aberration A of the system of FIG. 6 can be represented by the relation:

$$A/N = 2 \sin^{-1} Y/R - \tan^{-1}(Y/\sqrt{R^2 - Y^2} - (R/2))$$

where Y represents the distance that a ray 64 misses the apparent center of curvature C'. Since from the above equation A varies essentially as the cube of the angle of incidence I with the mirror 10, and since the effect of the plane surface of the back window 10 is to multiply the aberration by factor of N, the spherical aberration of an optical system can be represented by the relationship:

$$A = k I_o^3 = k N I^3$$

where $k$ is a constant and I represents the angles of incidence in the image combining block 58 and $I_o$ represents the angle of incidence in an open system using separate elements. Therefore, because the angle of incidence is directly related to the mirror's radius of curvature, the radius of curvatures for two systems having equal spherical aberrations is described by the following relation:

$$R = R_o \sqrt[3]{N}$$

where $R_o$ is the radius of curvature for a collimating mirror in a system having separate elements. As a result, the collimating mirror 10 has a larger radius R and hence focal length F in the collimating block 58 by a factor of $\sqrt[3]{N}$ for a system having the same spherical aberration A. For systems having equal radii R and $R_o$ the effect of spherical aberration on the image produced in the system will be reduced in the solid systems of FIGS. 5 and 6. Also, due to the fact that the collimating mirror's diameter D is related to the mirror's radius of curvature R by the equation:

$$D = Rf/N$$

the relationship between the diameter $D_o$ of a system using separate optical elements and the diameter D of the mirror 10 in the combining block 58 for equal aberration is:

$$D = D_o \sqrt[3]{N}/N$$

Since the diameter $d$ of the focal plane 22 is directly related to the mirror diameter D, the focal plane 22 of the image combining block 58 of FIG. 5 can be reduced by a factor of $\sqrt[3]{N}/N$ over a system having separate elements for equal fields of view $f$ and aberration A.

Thus, it should be apparent that in addition to substantial design flexibility, the use of a solid optic such as the collimating block 58 of FIG. 5 provides a head-up display that has a longer focal length F and a smaller mirror diameter D as compared to an open system for equal field angles $f$ and aberration A.

Another very significant advantage of using the combining block 58 is illustrated in FIG. 6. The location of the apparent center of curvature C' is approximately governed by the relation:

$$C' = W + (C - W)/N$$

As shown in FIG. 5 the most advantageous viewing position is slightly behind the apparent center of curvature C' so that the generated image is viewed with a minimum of spherical aberration. The preferred viewing position is behind the apparent center of curvature C' where the pilot 72 can see the whole field of view by moving his head by only 1 inch or so. In the preferred embodiment as shown in FIGS. 5 and 6, the length W should be made as small as possible as long as sufficient length is provided to encompass the mirror 10. In a system having a field of view $f$ of 20° the back window 20 will be located a distance W which is approximately one-third the optical distance from the apparent center of curvature C' to the collimating mirror 10. Thus, the optical distance from the observer's position 72 to the collimating mirror 10 would be more than three times the distance W from the back window 20 to the collimating mirror 10 since the preferred location 72 of the observer is behind the optical center of curvature C' as shown in FIG. 5.

An additional embodiment of the invention is shown in FIG. 7. Here the prism 52 is offset at right angles with the direction of viewing. This is a particularly advantageous arrangement in that the image combining block 58 can be rotated around the axis 66 of the image generator 62 thereby permitting the block 58 to be stowed out of sight by simply rotating it down and away from the viewer. Either the image window 22 of the prism 52 can be rotated about the image generator 62 or the image generator can be secured to the prism and rotate with the block 58. The arrangement shown in FIG. 7 is particularly useful in a number of applications such as a head-up display for the boom operator in a tanker aircraft where it may be desirable to remove the head-up display from the observer's view.

I claim:

1. An on-axis head-up optical display apparatus for use with an image generator comprising:
   an image combining block including: an image window on the lower surface of said black for admitting light rays from the image generator; a generally spherical collimating mirror disposed on the upper surface of said block for collimating said generated image light rays; a front window for admitting light rays from a background view; a combining surface for combining said background view with said collimated image light rays reflected from said collimating mirror; and a back window for viewing the combined image wherein said image window is located at the focal plane of said collimating mirror and is generally perpendicular to the optical axis of said collimating mirror.

2. The optical apparatus of claim 1 wherein said upper surface of said block is configured as a portion of a sphere with a predetermined radius to form said collimating mirror.

3. The optical apparatus of claim 2 wherein said combining surface results from the interface between two separate portions of said combining block wherein said portions are secured together by means of a bonding substance applied to one or both surfaces of said interface.

4. The optical apparatus of claim 1 wherein said block is comprised of at least two separate portions, wherein said combining surface is configured from the interface of said separate portions and oriented so as to transmit at least a portion of the light rays from said front window to said back window and to simultaneously relect an image from said collimating mirror to said back window.

5. The optical apparatus of claim 1 wherein said collimating mirror's optical axis is offset slightly from a perpendicular relationship with a line from an observer's eye to the center of the background view thereby minimizing the obstruction of the observer's upper field of view by said mirror.

6. The optical apparatus of claim 1 wherein said block is configured with sides substantially parallel to the observer's lateral field of view thereby minimizing the obstruction of the observer's lateral field of view by said sides.

7. The optical apparatus of claim 1 wherein said image windows at the focal plane abuts the image generator.

8. An on-axis head-up optical display apparatus for use with an image generator comprising:
   an image combining block including: an image window on the lower surface of said block for admitting light rays from the image generator; a generally spherical collimating mirror disposed on the upper surface of said block for collimating said image light rays; a front window; a combining surface for combining a background view from said front window with said collimated image; a back window for viewing the combined image; a reflecting surface interposed between said collimating mirror and said image window, wherein said image window is located at the optical focal plane of said collimating mirror and is effective to transmit the generated image to said reflecting surface from whence it is reflected to said collimating mirror.

9. The optical apparatus of claim 8 wherein said reflecting surface is located at an approximately 45° angle with the optical axis of said collimating mirror.

10. For use in an aircraft head-up optical display system having an image generator means, an image combining block comprising:
a first portion and a second portion secured together wherein the resulting interface forms a combining surface;
a collimating mirror located on an upper surface of said block for collimating light rays from the image generating means;
a front window for admitting light representing a background view;
an image window on a lower surface of the block located at the optical focal plane of said collimating mirror, generally perpendicular to the optical axis of said collimating mirror for admitting a generated image;
a back window suitable for observing the background view with the generated image integrated therein by means of said mirror and said combining surface.

11. The image combining block of claim 10 wherein the optical axis of said mirror is offset from a right angle relationship with the forward viewing axis of said block in order to minimize the obstruction of the forward view by said mirror.

12. The image combining block of claim 10 wherein said block is configured with each side substantially parallel to a line representing a lateral view emanating from an observer's viewpoint thereby reducing the lateral obstruction of the field of view.

13. The image combining block of claim 10 additionally including a reflective surface optically interposed between said collimating mirror and said image window wherein the focal plane of said collimating mirror is located in a non-perpendicular relationship with the axis of said collimating mirror.

14. The image combining block of claim 13 wherein said reflective surface forms an approximate 45° angle with the axis of said collimating mirror.

15. An on-axis head-up optical display apparatus for combining a generated image with a background view comprising:
an image generator for generating an image; and
an image combining block formed out of a material having an index of refraction N including: a front window for admitting light rays representing the background view; a back window generally parallel to and spaced apart from said front window for viewing the background view and said generated image; a generally spherical collimating mirror disposed on the upper surface of said image combining block for collimating said generated image; an image window located at the optical focal plane of said collimating mirror and in close opposition to said image generator, wherein the aspect ratio of the focal length F of said collimating mirror over the diameter D of said collimating mirror is approximately equal to N over $2f$ where $f$ is the desired field angle for the display apparatus; and a combining surface interposed between said front window and said back window effective to combine said generated image with the background view.

16. The optical apparatus of claim 15 wherein said back window is extended rearwardly from said front window so as to locate said collimating mirror's apparent center of curvature forward of a predetermined viewing position.

17. The optical apparatus of claim 16 wherein said back window is located approximately one-third the optical distance from the collimating mirror as the optical distance from the apparent center of curvature of said collimating mirror to said collimating mirror.

18. The optical apparatus of claim 15 wherein said back window is located less than one-third the optical distance from said collimating mirror than the optical distance to a predetermined viewing point from said collimating mirror.

19. An on-axis, head-up display apparatus having a field angle $f$ for combining a generated image with a background view comprising:
an image generator for generating the generated image; and
an image combining block formed out of a light transmitting material having an index of refraction N including: a front window for admitting the background view; a back window generally parallel to and spaced apart from said front window for viewing the background view and the generated image; a generally spherical collimating mirror disposed on the upper surface of said image combining block effective to collimate the light rays representing the generated image; a reflective surface located in the lower portion of said image combining block; and image window which in combination with said reflective surface serves to direct light rays representing the generated image from said image generator to said collimating mirror, wherein said image window is optically located at the focal plane of said collimating mirror and is in close opposition to said image generator; and a combining surface interposed between said front window and said back window effective to combine said generated image with the background view.

20. The apparatus of claim 19 wherein the aspect ratio of the focal length F of said collimating mirror over the diameter D of said collimating mirror is approximately equal to N over $2f$ where $f$ is the field angle of the apparatus.

21. The apparatus of claim 20 wherein said reflecting surface forms an approximately 45° angle with the normal from the center of said collimating mirror and a 45° angle from the plane of said image window.

22. An on-axis, head-up optical display apparatus for combining a generated image with a background view wherein said combined image is to be viewed from a predetermined viewing position comprising:
an image generator for generating an image; and
an image combining block including: a front window for admitting light rays representing the background view; a generally spherical collimating mirror disposed on the upper surface of said image combining block for collimating said generated image; a back window generally parallel to and spaced apart from said front window wherein the optical distance from said collimating mirror to said back window is less than one-third the optical distance from the predetermined viewing position to said collimating mirror; an image window located at the optical focal plane of said collimating mirror and in close opposition to said image generator and a combining surface interposed between said front window and said back window effective to combine said generated image with the background view.

23. An on-axis, head-up display apparatus for combining a generated image with a background view wherein said combined image is to be viewed from a predetermined viewing position comprising:

an image generator for generating an image; and an image combining block having an index of refraction N including a front window for admitting light rays representing the background view; a generally spherical collimating mirror disposed on the upper surface of said image combining block for collimating said generated image; a back window generally parallel to and spaced apart from said front window; an image window located at the optical focal plane of said collimating mirror and in close opposition to said image generator; and a combining surface interposed between said front window and said back window effective to combine said generated image with the background view, wherein the optical distance W from said back window to said collimating mirror is selected from the following relation:

$$C = W = (C - W)/N$$

wherein C is the center of curvature of said collimating mirror, so that the apparent center of curvature C′ of said collimating mirror is between said back window and said predetermined viewing position.

24. An on-axis, head-up display apparatus for combining a generated image with a background view comprising:

an image generator for generating an image; and an image combining block including a front window for admitting the background view; a back window generally parallel to and spaced apart from said front window; a generally spherical collimating mirror disposed on the upper surface of said image combining block; a light transmitting means secured to the lower surface of said image combining block including a reflective surface and an image window located at the focal plane of said collimating mirror wherein said image generator is in abutment with said image window, for transmitting the generated image by means of said reflective surface to said collimating mirror wherein the plane of said image window is perpendicular to the plane of said front window; and a combining surface interposed between said front window and said back window effective to combine said generated image with the background view.

25. The apparatus of claim 24 wherein said light transmitting means is a prism.

26. The apparatus of claim 24 wherein said image generator is rotatably connected to said light transmitting means thereby facilitating the rotation of said image combining block about said image generator.

* * * * *